(12) United States Patent
Seo et al.

(10) Patent No.: US 9,967,131 B2
(45) Date of Patent: May 8, 2018

(54) METHOD AND DEVICE FOR MEASUREMENT BY DEVICE-TO-DEVICE TERMINAL IN WIRELESS COMMUNICATION SYSTEM

(71) Applicant: LG ELECTRONICS INC., Seoul (KR)

(72) Inventors: Inkwon Seo, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/322,436

(22) PCT Filed: Jun. 29, 2015

(86) PCT No.: PCT/KR2015/006634
§ 371 (c)(1),
(2) Date: Dec. 27, 2016

(87) PCT Pub. No.: WO2015/199513
PCT Pub. Date: Dec. 30, 2015

(65) Prior Publication Data
US 2017/0163470 A1    Jun. 8, 2017

Related U.S. Application Data

(60) Provisional application No. 62/021,019, filed on Jul. 4, 2014, provisional application No. 62/017,848, filed on Jun. 27, 2014.

(51) Int. Cl.
*H04B 7/00* (2006.01)
*H04L 29/08* (2006.01)
(Continued)

(52) U.S. Cl.
CPC ....... *H04L 29/08306* (2013.01); *H04W 4/005* (2013.01); *H04W 24/10* (2013.01);
(Continued)

(58) Field of Classification Search
None
See application file for complete search history.

(56) References Cited

U.S. PATENT DOCUMENTS

2005/0002330 A1   1/2005  Cave et al.
2011/0275382 A1   11/2011 Hakola et al.
(Continued)

FOREIGN PATENT DOCUMENTS

EP    3190843    7/2017

OTHER PUBLICATIONS

PCT International Application No. PCT/KR20151006634, Written Opinion of the International Searching Authority dated Oct. 8, 2015, 23 pages.
(Continued)

*Primary Examiner* — Minh-Trang Nguyen
(74) *Attorney, Agent, or Firm* — Lee Hong Degerman Kang Waimey (57) ABSTRACT

An embodiment of the present invention relates to a method for measuring a device-to-device (D2D) signal by a D2D terminal in a wireless communication system, the method comprising the steps of: receiving a D2D signal; and carrying out a measurement using a reference signal included in the D2D signal, wherein the terminal determines the result of the measurement to be valid, when the measurement has been carried out within a measurement window, a value related to the intensity of the reference signal is higher than a preconfigured value, and the D2D signal has been successfully decoded.

11 Claims, 7 Drawing Sheets

(51) Int. Cl.
   *H04W 84/18*    (2009.01)
   *H04W 24/10*    (2009.01)
   *H04W 40/24*    (2009.01)
   *H04W 76/02*    (2009.01)
   *H04W 4/00*     (2018.01)

(52) U.S. Cl.
   CPC ....... *H04W 40/246* (2013.01); *H04W 76/023* (2013.01); *H04W 84/18* (2013.01)

(56) References Cited

U.S. PATENT DOCUMENTS

| | | | | |
|---|---|---|---|---|
| 2013/0324114 | A1* | 12/2013 | Raghothaman | H04W 76/023 455/426.1 |
| 2014/0003262 | A1* | 1/2014 | He | H04W 28/08 370/252 |
| 2014/0056220 | A1 | 2/2014 | Poitau et al. | |
| 2014/0133333 | A1* | 5/2014 | Liu | H04W 24/10 370/252 |
| 2014/0370904 | A1* | 12/2014 | Smith | H04W 8/005 455/450 |
| 2015/0045050 | A1* | 2/2015 | Sartori | H04W 8/005 455/452.1 |
| 2015/0189574 | A1* | 7/2015 | Ng | H04W 24/08 370/252 |

OTHER PUBLICATIONS

Munirul M Haque et al., "An Authentication based Lightweight Device Discovery (ALDD) Model for Pervasive computing Environment", In: Computer Software and Applications Conference (COMPSAC), Jul. 2007, 8 pages.

Jiajia Liu et al., "Device-to-Device Communications Achieve Efficient Load Balancing in LTE-Advanced Networks", IEEE Wireless Communications Magazine, vol. 21 No. 2, Apr. 2014, 9 pages.

European Patent Office Application Serial No. 15812634.2, Search Report dated Dec. 1, 2017, 7 pages.

LG Electronics, "Measurement for D2D synchronization", R1-144882, 3GPP TSG RAN WG1 Meeting #79, Nov. 2014, 3 pages.

* cited by examiner

METHOD AND DEVICE FOR MEASUREMENT BY DEVICE-TO-DEVICE TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2015/006634, filed on Jun. 29, 2015, which claims the benefit of U.S. Provisional Application No. 61/017,848, filed on Jun. 27, 2014 and 62/021,019, filed on Jul. 4, 2014, the contents of which are all hereby incorporated by reference herein in their entirety.

TECHNICAL FIELD

The following description relates to a wireless communication system and, more particularly, to a method and apparatus for measurement in a Device-to-Device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DETAILED DESCRIPTION OF THE INVENTION

Technical Problems

An object of the present invention is to provide a method of performing measurement and a method of determining validity of a measurement result in D2D communication.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method of measuring a Device-to-Device (D2D) signal by a D2D User Equipment (UE) in a wireless communication system, including receiving the D2D signal; and performing measurement using a reference signal included in the D2D signal, wherein, if the measurement is performed within a measurement window, a value related to strength of the reference signal is equal to or greater than a preset value, and the D2D signal is successfully decoded, the D2D UE determines that a result of the measurement is valid.

In another aspect of the present invention, provided herein is a Device-to-Device (D2D) User Equipment (UE) in a wireless communication system, including a reception module; and a processor, wherein the processor is configured to receive the D2D signal and perform measurement using a reference signal included in the D2D signal, and if the measurement is performed within a measurement window, a value related to strength of the reference signal is equal to or greater than a preset value, and the D2D signal is successfully decoded, the D2D UE determines that a result of the measurement is valid.

The D2D signal may be a discovery signal.

The measurement window may include a timing at which the measurement result is reported as an end point.

The measurement window may include a timing at which the measurement result is requested as a start point.

The value related to strength of the reference signal may be one of a Reference Signal Received Power (RSRP), a Reference Signal Received Quality (RSRQ), and a Received Signal Strength Indicator (RSSI).

If the measurement result is valid, the D2D UE may include a UE that has transmitted the D2D signal in a neighbor UE list.

The D2D UE may report the neighbor UE list to a Base Station (BS).

The neighbor UE list may be used when the BS selects a relay UE.

The D2D UE may report the neighbor UE list to the BS only when a preset number of UEs included in the neighbor UE list are changed.

The neighbor UE list may be reported at a preset period.

The neighbor UE list may include link quality information of the UE that reports the neighbor UE list and the BS.

If N or more measurement results are valid, the D2D UE may include a UE that has transmitted the D2D signal in a neighbor UE list.

Advantageous Effects

According to an embodiment of the present invention, a UE determines validity of a measurement result and reports the measurement report so that a more reliable measurement result can be used.

The effects that can be achieved through the present invention are not limited to what has been particularly described hereinabove and other effects not described herein will be more clearly understood by persons skilled in the art from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR CARRYING OUT THE INVENTION

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

Figure 1:
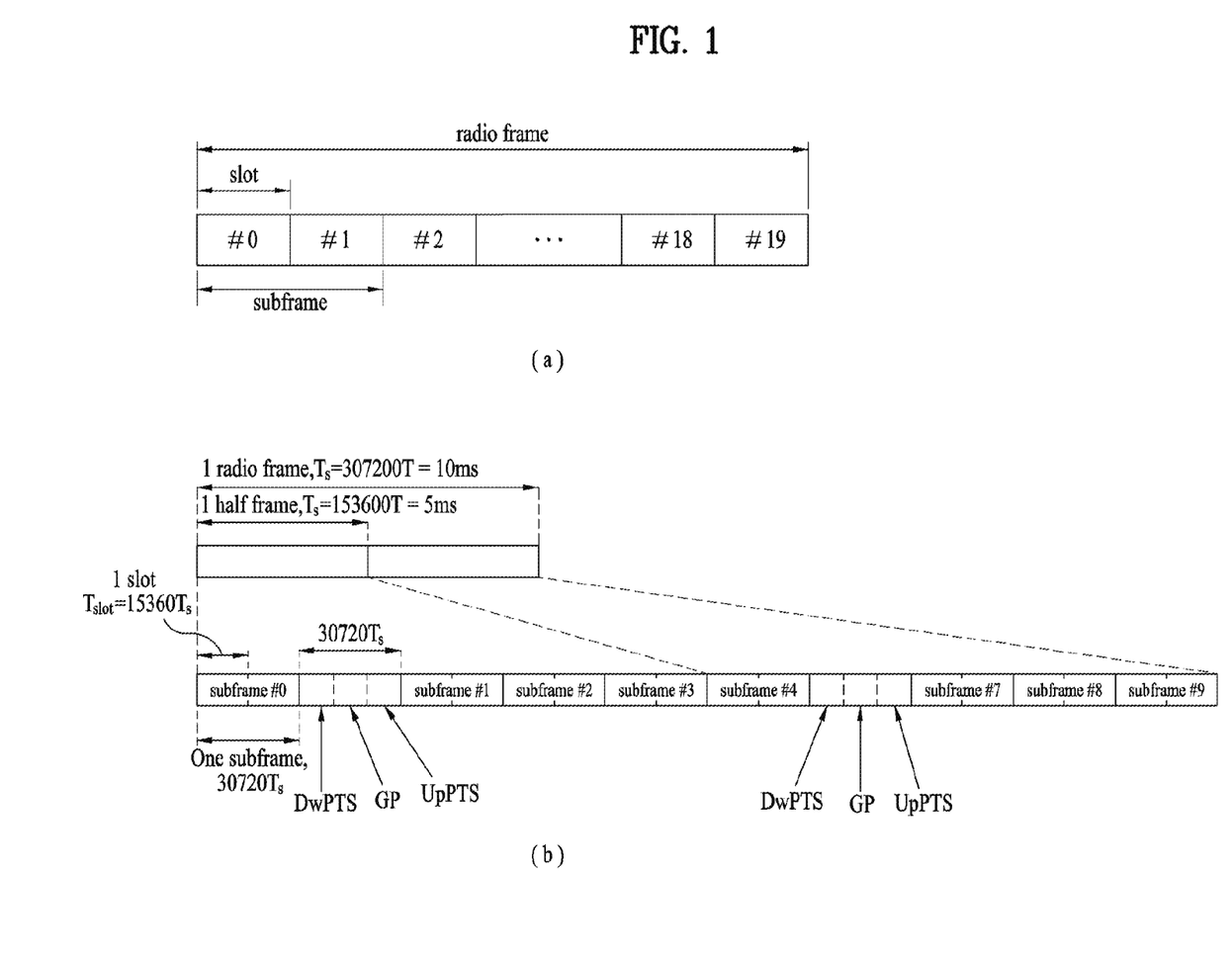
FIG. 1 is a diagram illustrating the structure of a radio frame.

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
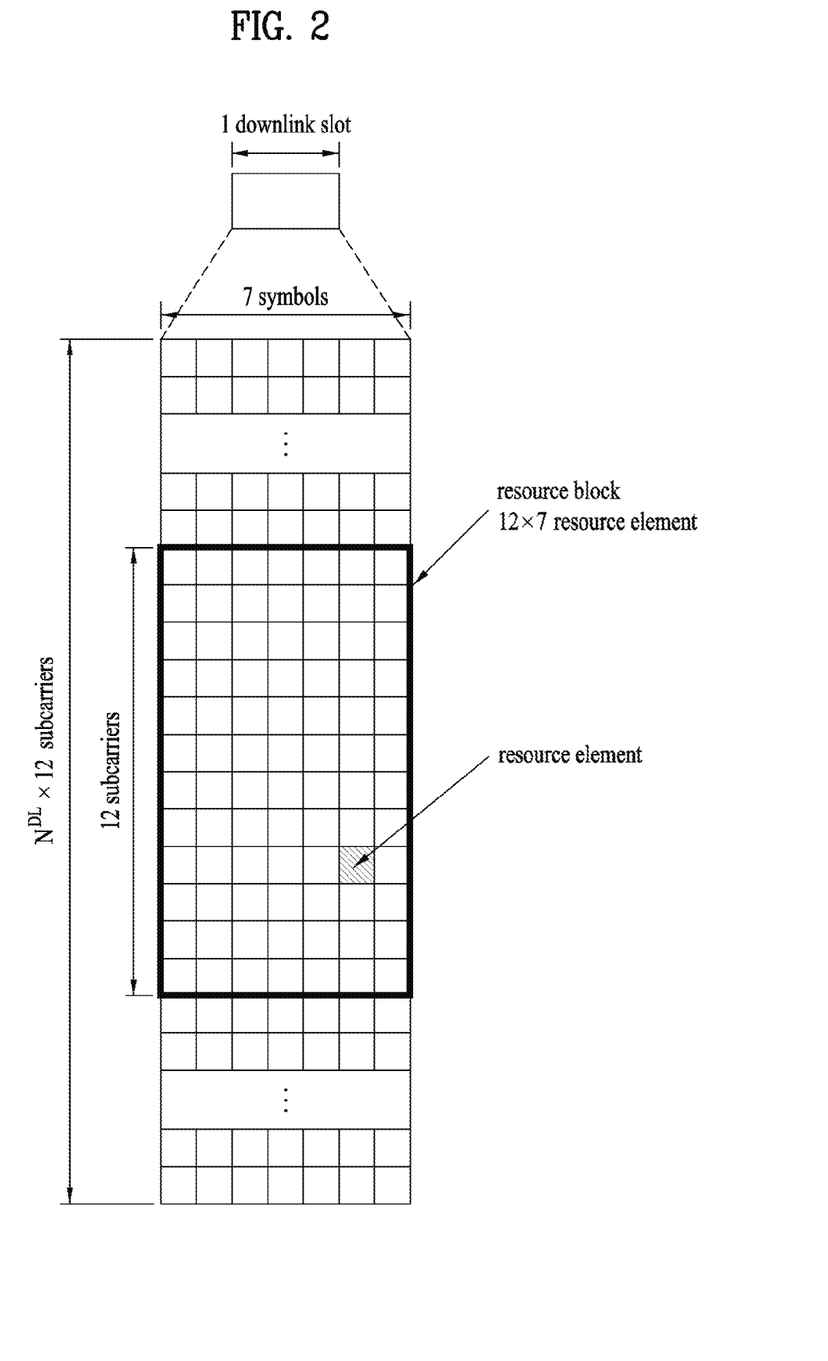
FIG. 2 is a diagram illustrating a resource grid for one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
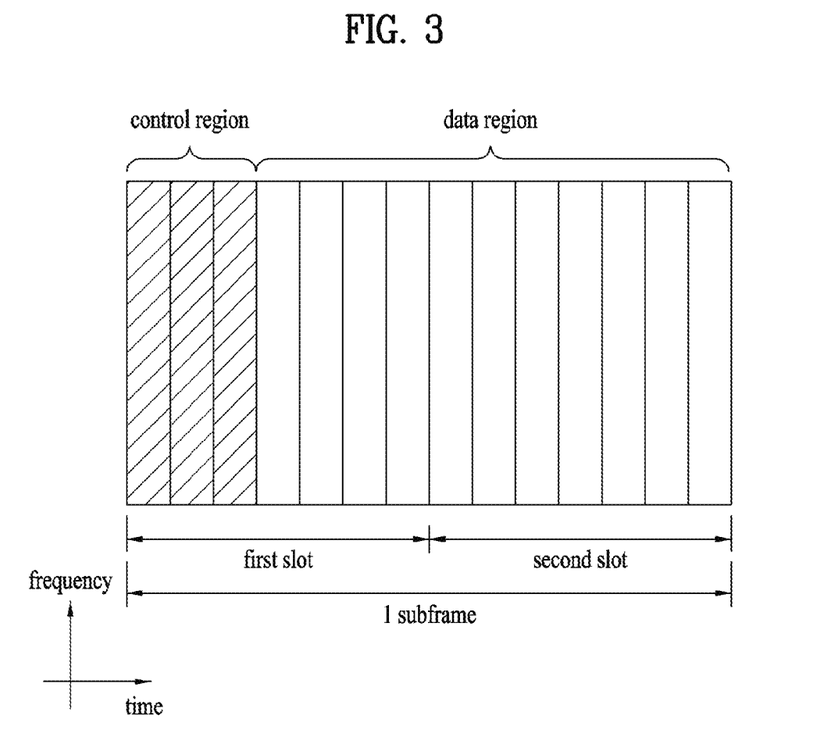
FIG. 3 is a diagram illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
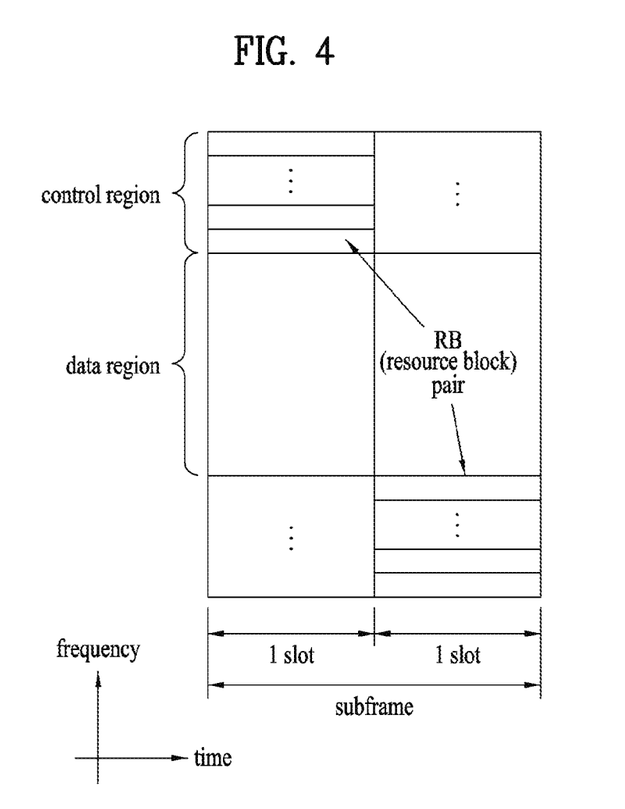
FIG. 4 is a diagram illustrating the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Measurement/Measurement Report

Measurement report is performed for one or more methods (handover, random access, cell search, etc.) for securing mobility of a UE. Since the measurement report requires coherent demodulation in some degree, the measurement report can be performed after a synchronization parameter and a physical layer parameter are obtained by a UE except reception signal strength measurement. The measurement report can include RRM measurement including RSRP (reference signal receive power), RSSI (received signal strength indicator), RSRQ (reference signal received quality), etc. for measuring signal strength of a serving cell and a neighboring cell or signal strength compared to total reception power and RLM measurement capable of evaluating whether or not a radio link is failed by measuring link quality with a serving cell.

In relation to the RRM, the RSRP is a liner average of power distribution of an RE in which a CRS is transmitted in downlink. The RSSI is a linear average of total reception power received by a UE and the RSSI is measured for an OFDM symbol including an RS for an antenna port 0. The RSSI corresponds to a measurement value including interference, noise power, and the like. If higher layer signaling indicates a specific subframe to measure the RSRQ, the RSSI is measured for all OFDM symbols included in the indicated specific subframe. The RSRQ is a value measured in a form of N*RSRP/RSSI. In this case, the N corresponds to the number of RBs of a corresponding bandwidth at the time of measuring the RSSI.

The RLM is performed to determine whether a UE is 'in-synch' or 'out-of-synch' for a corresponding cell by making the UE monitor downlink quality of a serving cell of the UE. In this case, the RLM is performed based on a CRS. The downlink quality estimated by the UE is compared with 'in-synch threshold (Qin) and 'out-of-synch threshold (Qout)'. The thresholds can be represented by a PDCCH BLER (block error rate) of a serving cell. In particular, the Qout and the Qin correspond to 10% BLER and 2% BLER, respectively. Practically, the Qin and the Qout are values corresponding to SINR of a received CRS. If reception SINR of the CRS is equal to or greater than a predetermined level (Qin), a UE determines to attach to a corresponding cell. If the reception SINR is equal to or less than the predetermined level (Qout), the UE declares RLF (radio link failure.

Synchronization Acquisition of D2D UE

In the following, synchronization acquisition between UEs in D2D communication is explained based on the aforementioned description and a legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

A transmission period of a D2DSS is not less than 40 ms and one or more symbols can be used for transmitting a D2DSS in a subframe.

D2DSSs may include a primary D2DSS (PD2DSS) or a primary sidelink synchronization signal (PSSS) and a secondary D2DSS (SD2DSS) or a secondary sidelink synchronization Signal (SSSS). The PD2DSS may be configured to have a similar/modified/repeated structure of a Zadoff-chu sequence of a predetermined length or a primary synchronization signal (PSS), and the SD2DSS may be configured to have a similar/modified/repeated structure of an M-sequence or a secondary synchronization signal (SSS).

When a D2D UE selects a D2D synchronization source, it is necessary to apply an identical priority reference. In out-coverage situation, if signal strength of all received D2DSSs is equal to or less than a predetermined value, a UE may become a synchronization source. And, in in-coverage situation, an eNB can configure a UE as a synchronization source. If UEs match synchronization with each other from an eNB, a synchronization source may correspond to the eNB and a D2DSS may correspond to a PSS/SSS. A D2DSS of a synchronization source induced from an eNB may be different from a D2DSS of a synchronization source not induced from the eNB.

A PD2DSCH (physical D2D synchronization channel) may correspond to a (broadcast) channel on which (system) information (e.g., D2DSS-related information, duplex mode (DM), TDD UL/DL configuration, resource pool-related information, a type of application related to a D2DSS, etc.), which is basic information to be firstly known to a UE before a D2D signal is transmitted and received, is transmitted. The PD2DSCH can be transmitted in a subframe in which a D2DSS is transmitted or a following subframe.

The D2DSS may correspond to a specific sequence and the PD2DSCH may correspond to a sequence representing specific information or a codeword produced by predetermined channel coding. In this case, the SRN may be an eNB or a specific D2D UE. In the case of partial network coverage or out of network coverage, a UE may become a synchronization source.

Figure 5:
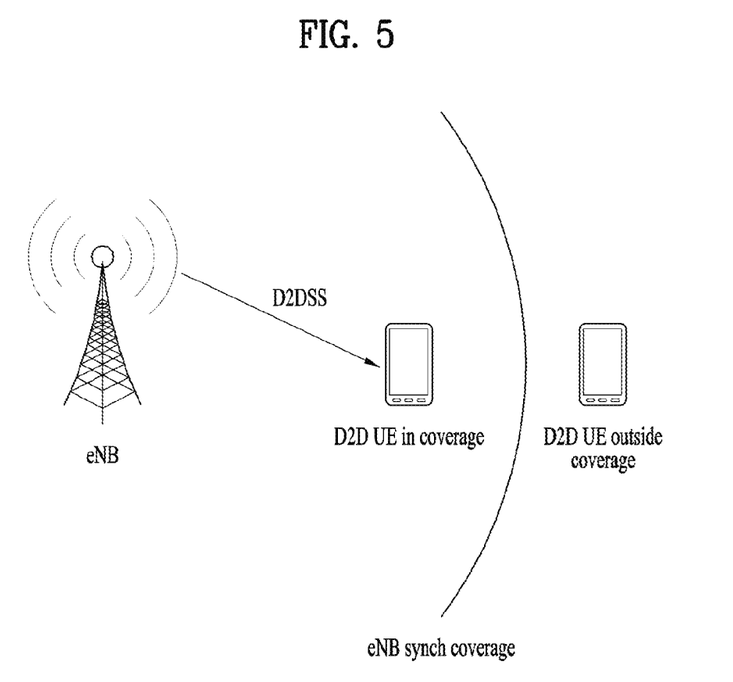
FIGS. 5 and 6 are diagrams illustrating relaying of a synchronization signal.

In a situation as illustrated in FIG. 5, a D2DSS may be relayed for D2D communication with an out-of-coverage UE. The D2DSS may be relayed over multiple hops. In the following description, relaying a synchronization signal means not only direct Amplify-and-Forward (AF) relay of the synchronization signal transmitted by an eNB but also transmission of a D2DSS of a separate format at a reception time of the synchronization signal. As the D2DSS is relayed in this way, an in-coverage UE may directly communicate with the out-of-coverage UE.

Figure 6:
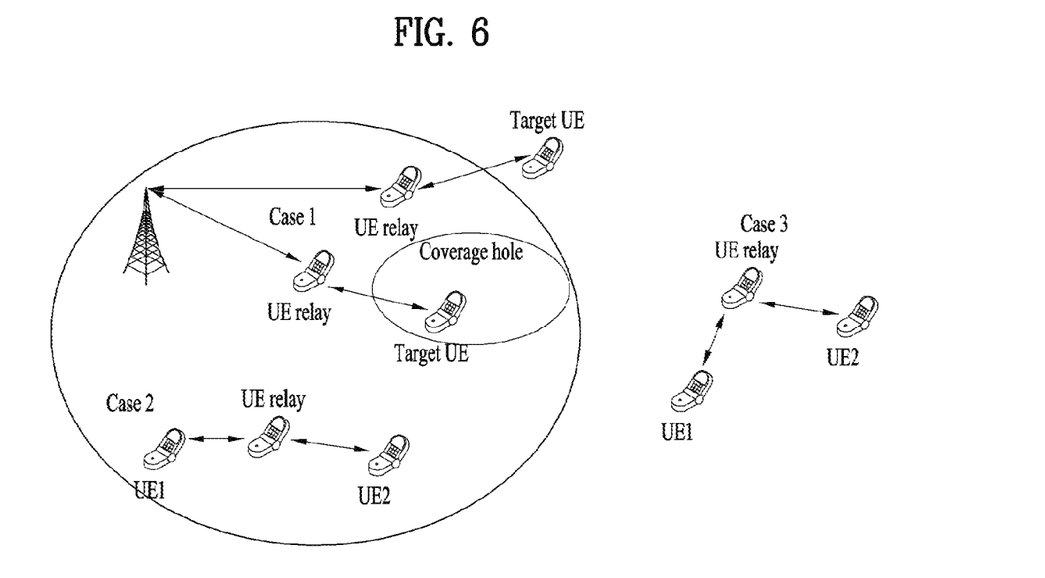

FIG. 6 illustrates various environments of relay UEs mentioned in FIG. 5. Referring to FIG. 6, a relay UE may relay signal transmission and reception between a target UE located in a coverage hole and an eNB (Case 1), relay signal transmission and reception between UEs that perform D2D communication in coverage (Case 2), or relay signal transmission and reception between UEs that perform D2D communication out of coverage (case 3).

Hereinafter, a method of performing measurement by a D2D UE, determination of validity of a measured result, and use of the measured result according to an embodiment of the present invention will be described based on the above description. In the following description, an eNB may mean not only a transmission point/reception point but also a cluster header UE that serves as a scheduler of a D2D cluster when the D2D cluster is configured out of coverage, and a cell or coverage may be interpreted as a region in which resources are determined to be used by scheduling of the eNB. In addition, in the present invention, measurement includes decoding of a corresponding signal as well as energy detection in a corresponding region.

Method of Performing Measurement by D2D UE and Determination of Validity

Upon receiving a D2D signal, a UE may perform measurement based on the received D2D signal. A result of measurement may be judged/determined to be valid when measurement is performed within a measurement window, a value related to strength of a Reference Signal (RS) is equal to or greater than a preset value, and/or decoding of the D2D signal is successful.

In this case, success of decoding may mean that it is determined that there is no error as a result of confirming Cyclic Redundancy Check (CRC).

The measurement window may include a timing at which a measurement result is reported as an end point or a timing at which the measurement result is requested as a start point. The size of the measurement window may be determined in consideration of a channel state, a distance between D2D UEs, or mobility of the D2D UEs and may be directly determined by a UE or indicated through higher-layer/physical-layer signaling. A reporting timing at which the measurement result is reported may be designated by the eNB and indicated by DL control signaling that is distinguished from a legacy UL grant, such as a D2D grant, or DL assignment. As another method, the reporting timing may be defined such that the measurement result is reported at a predetermined period and the reported period may be configured through higher-layer signaling or using a predefined scheme. The reporting timing may be triggered by a specific criterion. For example, if a specific number of out-of-coverage UEs is discovered, this information may be reported at an arbitrary time or a predetermined time.

The value related to strength of the RS may be one of Reference Signal Received Power (RSRP), Reference Signal Received Quality (RSRQ), and Received Signal Strength Indicator (RSSI). In the case of RSRP/RSRQ, RSRP/RSRQ may be used together with information as to whether decoding is successful or RSRP/RSRQ is solely measured when an ID of a transmission (and/or reception) UE is linked with the RS.

A D2D signal about which measurement is performed may be limited to a signal defined only in a D2D operation, such as a discovery signal, a D2D communication signal, a D2D synchronization signal, or a D2D Scheduling Assignment (SA) signal or may include a UL Sounding Reference Signal (SRS) or a UL demodulation RS. To measure the D2D signal corresponding to a measurement target, the eNB may signal a resource region in which the D2D signal is capable of being measured to UEs belonging to a cell thereof through cell-specific or UE-specific signaling. The cell-specific or UE-specific signaling may include signaling of a time-domain resource (e.g., a D2D subframe set, a measurement symbol set, etc.) and a frequency-domain resource (e.g., a system bandwidth, a Physical Resource Block (PRB) pair set, etc.). The resource region may be signaled with respect to each measured signal (e.g., a D2D discovery signal, a D2D synchronization signal, a D2D SA signal, a cellular SRS/DMRS, etc.). For example, the eNB may request that all UEs (or specific UEs) in a cell decode a discovery signal per D2D discovery resource unit (e.g., 2 PRB pairs) in a specific subframe (e.g., subframe #2) of a radio frame having an SFN of 4N (where N=0, 1, 2, . . . ) and report IDs of discovered UEs. The eNB may signal what should be measured to the UEs or the measurement objects may be predefined. For example, the eNB may instruct the UE to inform the eNB of whether decoding of a D2D discovery (or SA or communication channel) signal is successful and to measure a part or combination of RSRP/RSRQ (including RSSI) of the SA (or communication channel) signal and RSRP/RSRQ (including RSSI) of an RS used for a legacy cellular operation.

UEs that perform measurement for the D2D signal may include UEs (capable of performing a D2D operation) in a cell, for example, UEs that are performing the D2D operation, UEs that are performing a cellular operation, and UEs in an idle mode. A criterion for selecting the UEs that are to perform measurement and reporting may be predefined or may be signaled by the eNB. The UEs that are to perform reporting may be selected by a constraint in the time domain, a constraint of a measurement value, and a constraint of the number of reported UEs. In this case, each constraint may be implemented alone or in combination. The constraint in the time domain may serve to reduce inaccuracy generated by mobility of a UE and it may be determined through the constraint in the time domain that a result measured only within a range which does not exceed a predetermined time starting from a reporting time or a reporting requested time is valid (i.e., measurement within a specific time window is valid). In this case, the predetermined time may be pre-defined or may be signaled by the eNB. The constraint for the measurement value may be defined as configuration of a threshold value for strength of a measured signal or as success/failure of decoding for the measured signal. For example, upon success of decoding for the discovery signal or the SA signal, a UE may report an ID of a UE that has transmitted/received the corresponding signal to the eNB. As another example, if a D2D resource is managed by the eNB, a UE may measure RSSI, RSRP, or RSRQ of a D2D resource unit. If a measured value is higher than the predetermined threshold value, the UE may report an index of the resource unit to the eNB. Then, the eNB may confirm corresponding reporting and a scheduling situation thereof and determine which UEs are present in the vicinity of the UE that has performed reporting. The constraint of the number of reported UEs may mean that only UEs of a specific number or UEs in a specific situation among discovered UEs are reported. For example, if only three UEs among discovered UEs can be reported according to pre-definition or signaling of the eNB, UEs that are to be reported may be determined based on signal strength or three UEs may be randomly selected among the discovered UEs. As another example, reporting may be performed only when a UE out of coverage is discovered.

Use/Reporting of Measurement Result by D2D UE

As described earlier, if a measurement result is valid, a UE that has performed measurement may include a UE that has transmitted a D2D signal in a neighbor UE list. This neighbor UE list may be reported to the eNB. The eNB may select a relay UE and/or a target UE from the neighbor UE list.

The UE may report the neighbor UE list to the eNB only when a preset number of UEs included in the neighbor UE list are changed. In other words, when a specific number of more of UEs belonging to a previously reported neighbor UE list are changed, the UE may perform reporting. For example, when 5 or more UEs are newly added to the list and/or 5 or more UEs are excluded from the list, the UE may report the neighbor UE list to the eNB. To reduce overhead, only the changed UEs may be reported.

Figure 7:
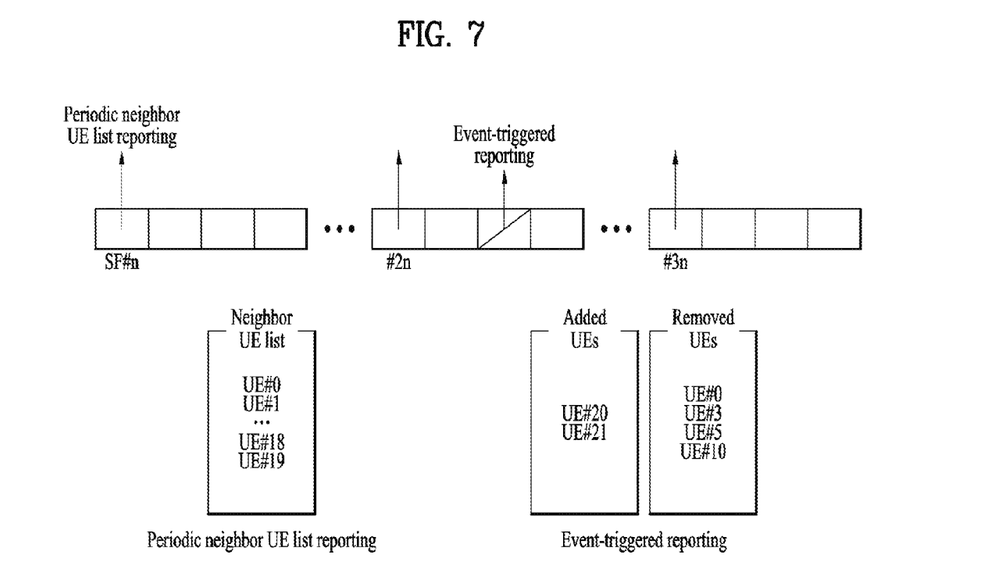
FIGS. 7 to 9 are diagrams illustrating measurement and/or reporting according to an embodiment of the present invention.

An example of such a reporting scheme is illustrated. Referring to FIG. 7, for reporting of a neighbor UE list, a reporting period has been configured and event-triggered reporting may be performed within the period when a specific number of UEs included in the list are changed, as described previously. Periodic reporting may be omitted when there is no variation in the list compared with previous reporting. In periodic reporting of FIG. 7, 20 UEs of UE#0 to UE#19 are included in the neighbor UE list. In event-triggered reporting, UE#0, UE#3, UE#5, and UE#10 are removed from the list and UE#20 and UE#21 are newly added to the list. In FIG. 7, event-triggered reporting may be performed when an added UE list and a removed UE list simultaneously satisfy a criterion or the lists may be reported alone. When the lists are reported alone, a corresponding field of an unreported list may be set to null (or 0) or the corresponding field may not be transmitted.

Figure 8:
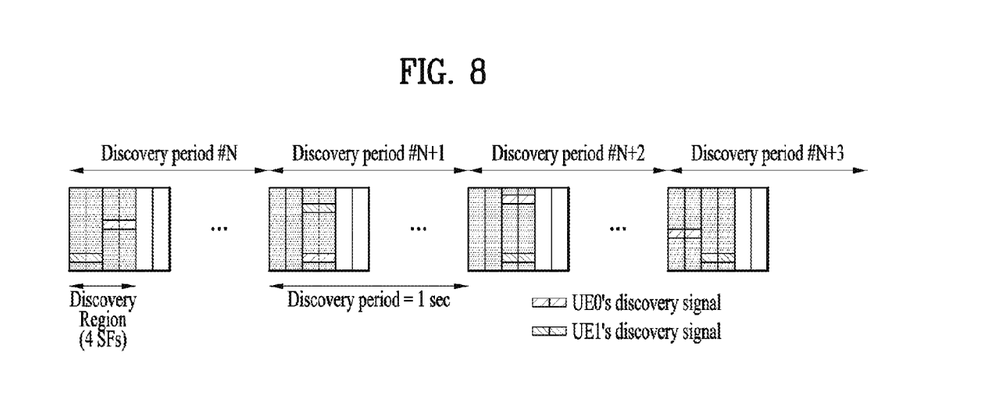

Elements such as discovery frequency and discovery continuity may be applied when reported UEs are selected or a discovered UE list is configured. That is, when N or more measurement results are valid, a UE may include a UE that has transmitted a D2D signal as a neighbor UE list. Alternatively, when M exclusion determination criteria are consecutively satisfied, corresponding UEs may be excluded from the neighbor UE list or from reporting. Referring to FIG. 8, a discovery region in which a discovery signal can be transmitted or received is located at every discovery period (e.g., 1 sec as shown) and each discovery region includes four subframes. Success in successive detection of three times of the discovery signal may be configured as a neighbor UE discovery determination criterion and failure of successive detection of two times of the discovery signal may be configured as an exclusion determination criterion. In this case, if UE 0 has successively detected the discovery signal of UE 1 three times before discovery period #N, UE 0 may include UE 1 in a discovered UE list thereof and/or inform the eNB that UE 1 is present in the vicinity thereof. Next, at discovery periods #N+1 and #N+2, since UE 0 and UE 1 transmit discovery signals on the same time resource, the D2D discovery signals of UE 0 and UE 1 cannot be detected and UE 0 may exclude UE 1 from the discovered UE list in period #N+2. If UE 0 successively detects UE 1 during three discovery periods from period #N+3, UE 0 may include UE 1 in the discovered UE list thereof. This method may prevent a half duplex problem of D2D UEs and frequent update/reporting of the discovered UE list caused by collision with cellular UL transmission. A measurement window of neighbor UE discovery may be set to an integer multiple of a discovery period (e.g., 1, 2, 3, 4, . . . ). That is, if measurement is performed during a time corresponding to multiple discovery periods and neighbor UE discovery is successful within the window, a corresponding UE may be included in the neighbor UE list or the neighbor UE list may be maintained. Likewise, if discovery is not successful in the window, a corresponding UE may be excluded from the list.

Meanwhile, the neighbor UE list may include link quality information of a UE that reports the neighbor UE list and an eNB. For example, information about RSRP/RSRQ of each UE may be additionally reported. Upon receiving reporting on the information, the eNB may select a more stable relay UE using the information about RSRP/RSRQ. For example, if UE 2 is included in both a neighbor UE list of UE 0 and a neighbor UE list of UE 1 and RSRP/RSRQ of UE 2 measured by UE 0 is higher than RSRP/RSRQ of UE 2 measured by UE 1, the eNB may determine that a link between UE 0 and UE 2 is good and select UE 0 as a relay UE. In order to reduce overhead generated by reporting additional information such as RSRP/RSRQ, a UE may arrange UEs of a neighbor UE list in order of link quality and report the neighbor UE list. The eNB may select, as the relay UE, a UE having a low index among UEs including a target UE in the list. In addition, the above proposed event-triggered reporting may include a criterion for RSRP/RSRQ. For example, if a variation of RSRP/RSRQ is equal to or greater than a specific value, the event-triggered reporting may be triggered. In this case, even though there is no variation in the UE list, reporting may be performed.

In addition, the above reporting may include information as to whether a discovered UE belongs to network coverage. (Alternatively, only UEs that are not within coverage among discovered UEs may be reported.) Whether a discovered UE is within coverage may be determined by a measurement method. This is useful when a UE that is outside coverage cannot transmit a D2D discovery signal. For example, if the D2D discovery signal is not detected but an SA signal transmitted in D2D communication is detected, it may be determined that a corresponding UE is an out-of-coverage UE and then reporting may be performed. Thus, if a criterion for coverage is added, the neighbor UE list of FIG. 7 may be divided into two fields (an in-coverage UE list and an out-of-coverage UE list) or may be defined to report only the out-of-coverage UE list.

Determination of Out-of-Coverage UEs and Signaling Necessary Therefor

As a method for determining out-of-coverage UEs, information capable of identifying a transmission UE may be included in a discovery signal. That is, the discovery signal may include signaling indicating whether a UE is an out-of-coverage UE or an in-coverage UE. To this end, a specific state of a field indicating a cell ID (or an identifier capable of identifying cell or operator information corresponding to the cell ID) may be designated to indicate out-of-coverage or a 1-bit signal indicating out-of-coverage/in-coverage may be introduced.

Alternatively, information indicating whether a UE is an out-of-coverage UE may be included in an SA signal. If the out-of-coverage UE cannot transmit a discovery signal, it may be determined whether a UE is a transmission/reception UE and whether a UE is an out-of-coverage UE or an in-coverage UE, using the SA signal or a D2D communication channel linked with the SA signal. To this end, the SA signal (and/or D2D communication channel) may include information indicating whether a UE is an out-of-coverage UE or an in-coverage UE and include transmission/reception UE IDs of a D2D pair. Alternatively, a specific state of information (e.g., cell ID or PLMN ID) transmitted through the SA signal or the communication channel may be defined to indicate out-of-coverage and may be configured to be aware that the information is transmitted from the out-of-coverage UE when the state is decoded.

Figure 9:
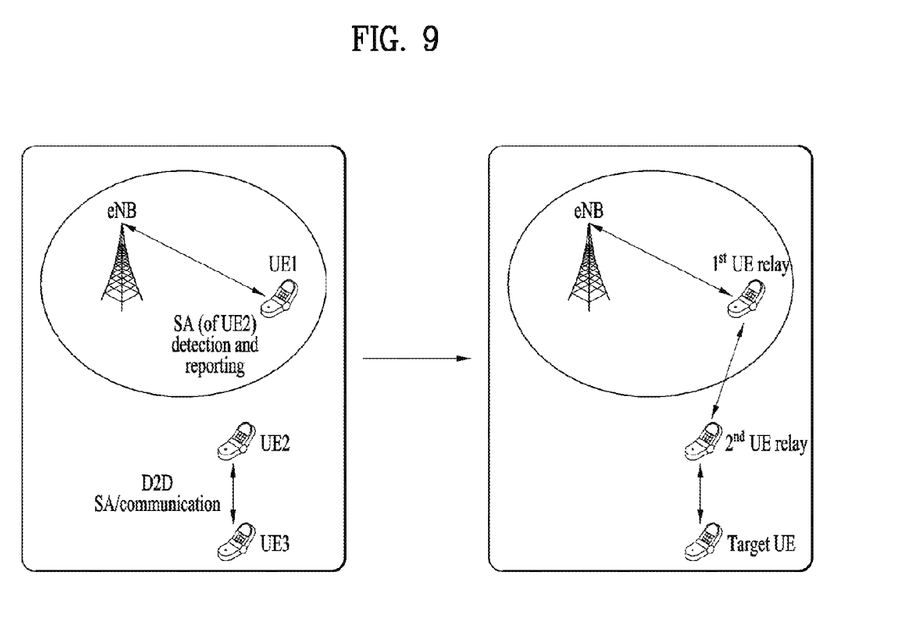

The SA signal may be used for 3-hop relay. For example, if transmission/reception UE IDs of a D2D pair are included in the SA signal (the UE IDs may be transmitted through explicit signaling or implicit signaling and the implicit signaling may indicate sequence generation or cyclic shift determination using the transmission/reception UE IDs). A third UE that has decoded the SA signal may configure and/or report a transmission UE as a relay capable UE. That is, the transmission UE may relay data to a reception UE and a specific UE (i.e., a UE that has detected the SA signal of the D2D pair) may relay data to the transmission UE. FIG. 9 illustrates an example of 3-hop relay using an SA signal. In FIG. 9, UE 2 and UE 3 perform a D2D operation out of coverage and it is assumed that the SA signal includes transmission/reception UE IDs (or information corresponding thereto) of a corresponding D2D pair. In FIG. 9, UE 1 may decode an SA signal (or D2D communication channel) transmitted by a UE and report that UE 2 and UE 3 are present in the vicinity of UE 1 to an eNB. In this case, a signal strength result for UE 3 as well as a signal strength result for UE 2 may also be reported and, if the signal of UE3 is not measured, UE 1 may inform the eNB that data can be transmitted to UE 3 through UE 2. Consequently, if UE 3 is a target UE, the eNB may transmit data to the target UE using UE 1 as a first relay and UE 2 as a second relay.

While the out-of-coverage UE has been determined by decoding the discovery signal or the SA signal thereof in the above description, the eNB may signal a UE list that should be excluded from measurement or reporting (i.e., a UE list that does not need to be managed by a UE or a UE list managed by the eNB). Upon receiving such a UE list, a UE may report UEs excluding UEs included in the list among UEs determined to be present in the vicinity thereof. Alternatively, when measurement is performed using UE IDs, measurement using UE IDs included in the list may not be performed.

Meanwhile, measurement and neighbor UE list determination/reporting may also be performed as follows. Each in-coverage UE periodically performs the above-proposed measurement and stores a measured result. If a UE to or from which transmission or reception is needed is not present in coverage of the eNB, the eNB broadcasts an ID (or information corresponding thereto) of the corresponding target UE to an in-coverage region and waits for feedback from in-coverage UEs. Upon discovering the target UE broadcast by the eNB, a UE may transmit, to the eNB, feedback indicating that communication with the target UE can be performed and the UE can operate as a relay. Then, the eNB may perform communication with the target UE through the UE. In this case, broadcast may be performed through cell-specific signaling or UE-group-specific signaling. Herein, a UE group may be a D2D capable UE group or D2D UE relay capable UE group. As another method, if the eNB can identify the location of each in-coverage UE through a method such as positioning, the eNB may indicate the target UE to UEs on a cell edge through UE-specific signaling.

Alternatively, the eNB may broadcast information about the target UE and, when the target UE broadcast by the eNB is present, a relay capable UE may inform the eNB that relaying can be performed.

Configuration of Apparatuses According to Embodiment of the Present Invention

Figure 10:
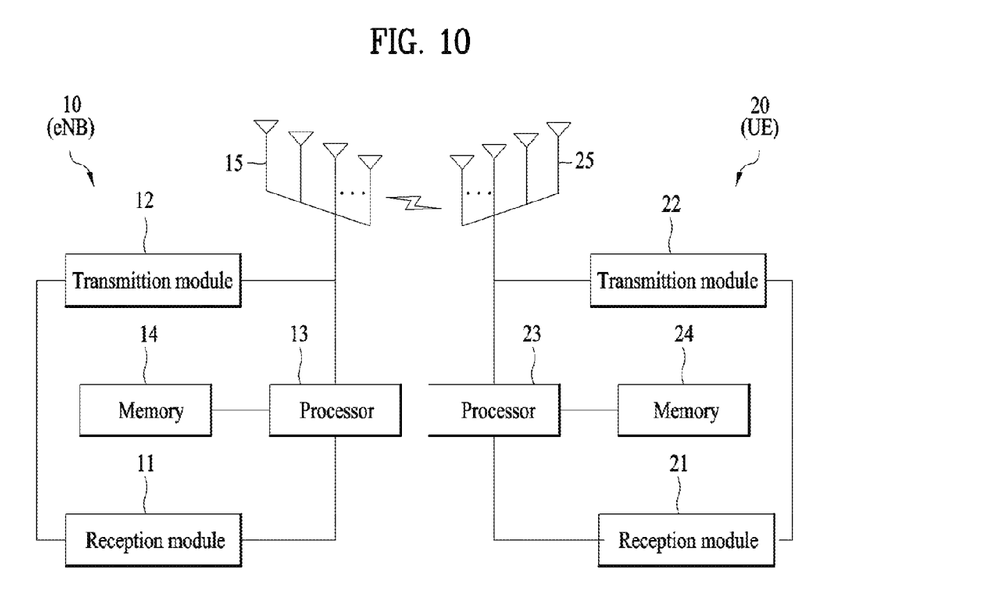
FIG. 10 is a diagram illustrating configuration of transmission and reception apparatuses.

FIG. 10 is a diagram illustrating configuration of a transmission point and a UE according to an embodiment of the present invention.

Referring to FIG. 10, a transmission point 10 according to the present invention may include a Reception (Rx) module 11, a Transmission (Tx) module 12, a processor 13, a memory 14, and a plurality of antennas 15. Use of the plurality of antennas 15 means that the transmission point 10 supports MIMO transmission and reception. The Rx module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

The processor 13 of the transmission point 10 processes received information and information to be transmitted to the outside of the transmission point 10. The memory 14 may store the processed information for a predetermined time and may be replaced with a component such as a buffer (not shown).

Referring to FIG. 10 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

The processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the various embodiments of the present invention described above may be implemented independently or in combination of two or more thereof. A redundant description is omitted for clarity.

The description of the transmission point 10 in FIG. 10 is identically applicable to a relay as a DL transmitter or a UL receiver, and the description of the UE 20 in FIG. 10 is identically applicable to a relay as a DL receiver or a UL transmitter.

The embodiments of the present invention may be implemented by various means, for example, hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

What is claimed is:

1. A method of measuring a Device-to-Device (D2D) signal by a D2D User Equipment (UE) in a wireless communication system, the method comprising:

receiving, by the UE, a D2D discovery signal;

performing, by the UE, a measurement using a reference signal included in the D2D discovery signal; and determining whether a result of the measurement is valid by decoding the D2D discovery signal, wherein, only if the D2D discovery signal is decoded without a Cyclic Redundancy Check (CRC) error, the result of the measurement is determined to be valid, wherein, if the D2D discovery signal is not decoded without the CRC error, the result of the measurement is determined to be invalid, and wherein the result of the measurement is a Reference Signal Received Power (RSRP).

2. The method according to claim 1, wherein the measurement is performed within a measurement window that includes a timing at which the measurement result is reported as an end point.

3. The method according to claim 2, wherein the measurement window includes a timing at which the measurement result is requested as a start point.

4. The method according to claim 1, wherein, if the measurement result is determined to be valid, the D2D UE includes a UE that has transmitted the D2D discovery signal in a neighbor UE list.

5. The method according to claim 4, further comprising:
reporting the neighbor UE list to a Base Station (BS).

6. The method according to claim 5, wherein the neighbor UE list is used when the BS selects a relay UE.

7. The method according to claim 4, further comprising:
reporting the neighbor UE list to the BS only when a preset number of UEs included in the neighbor UE list are changed.

8. The method according to claim 7, wherein the reporting comprises:
reporting the neighbor UE list at a preset period.

9. The method according to claim 5, wherein the neighbor UE list includes link quality information of the UE that reports the neighbor UE list and the BS.

10. The method according to claim 1, wherein the measurement is for a linear average of a power distribution of resource elements in which the reference signal is transmitted.

11. A Device-to-Device (D2D) User Equipment (UE) in a wireless communication system, the D2D UE comprising:
a reception module; and
a processor,
wherein the processor is configured to:
receive a D2D discovery signal,
perform measurement using a reference signal included in the D2D discovery signal, and
determine whether a result of the measurement is valid by decoding the D2D discovery signal, and
wherein, only if the D2D discovery signal is decoded without a Cyclic Redundancy Check (CRC) error, the result of the measurement is determined to be valid,
wherein, if the D2D discovery signal is not decoded without the CRC error, the result of the measurement is determined to be invalid, and
wherein the result of the measurement is a Reference Signal Received Power (RSRP).

* * * * *